United States Patent
Matsuo (10) Patent No.: US 10,182,395 B2
(45) Date of Patent: Jan. 15, 2019

(54) TERMINAL, BASE STATION, RECEPTION QUALITY REPORTING METHOD, AND DATA TRANSMISSION STATE SWITCHING METHOD

(71) Applicant: Panasonic Intellectual Property Management Co., Ltd., Osaka (JP)

(72) Inventor: Hidenori Matsuo, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 193 days.

(21) Appl. No.: 15/126,230

(22) PCT Filed: May 30, 2014

(86) PCT No.: PCT/JP2014/002881
§ 371 (c)(1),
(2) Date: Sep. 14, 2016

(87) PCT Pub. No.: WO2015/140840
PCT Pub. Date: Sep. 24, 2015

(65) Prior Publication Data
US 2017/0086135 A1 Mar. 23, 2017

(30) Foreign Application Priority Data
Mar. 19, 2014 (JP) .................. 2014-056486

(51) Int. Cl.
*H04W 52/02* (2009.01)
*H04W 16/32* (2009.01)
(Continued)

(52) U.S. Cl.
CPC ....... *H04W 52/0206* (2013.01); *H04W 16/32* (2013.01); *H04W 24/02* (2013.01);
(Continued)

(58) Field of Classification Search
CPC . H04W 16/32; H04W 24/02; H04W 28/0289; H04W 36/08
(Continued)

(56) References Cited

U.S. PATENT DOCUMENTS 8,509,783 B2  8/2013  Iwamura
9,338,719 B2  5/2016  Iwamura
(Continued)

FOREIGN PATENT DOCUMENTS

WO    2009/119595 A1    10/2009

OTHER PUBLICATIONS

3GPP TR 36.872 V1.0.0, $3^{rd}$ Generation Partnership Project; Technical Specification Group Radio Access Network; Small cell enhancements for E-UTRA and E-UTRAN—Physical layer aspects (Release 12), Aug. 2013, 3 pages.
(Continued)

*Primary Examiner* — Jae Y Lee
*Assistant Examiner* — Jean F Voltaire
(74) *Attorney, Agent, or Firm* — Seed IP Law Group LLP (57) ABSTRACT

The objective of the invention is to control switching of ON/OFF states of a cell without increasing the overhead of signaling to a terminal. A setting information reception unit (203) receives setting information related to a second offset value to be commonly added to reception-quality measurement-values of OFF-state base stations. A base station state determination unit (206) determines whether a reception quality measurement-target base station is an ON-state base station or an OFF-state base station. If the reception quality measurement-target base station is an OFF-state base station, the base station state determination unit (206) calculates a reception-quality measurement-result by adding at least the second offset value to a reception-quality measurement-value of the reception quality measurement-target base
(Continued)

station, and then determines whether to report the reception-quality measurement-result.

13 Claims, 7 Drawing Sheets

(51) Int. Cl.
*H04W 24/10* (2009.01)
*H04W 36/08* (2009.01)
*H04W 24/02* (2009.01)
*H04W 28/02* (2009.01)

(52) U.S. Cl.
CPC ....... *H04W 24/10* (2013.01); *H04W 28/0289* (2013.01); *H04W 36/08* (2013.01); *Y02D 70/00* (2018.01); *Y02D 70/1262* (2018.01); *Y02D 70/1264* (2018.01)

(58) Field of Classification Search
USPC ....................................................... 370/230
See application file for complete search history.

(56) References Cited

U.S. PATENT DOCUMENTS

| | | | |
|---|---|---|---|
| 2010/0008246 A1* | 1/2010 | Watanabe | H04L 1/20 370/252 |
| 2011/0092214 A1 | 4/2011 | Iwamura | |
| 2012/0252479 A1* | 10/2012 | Morita | H04W 52/143 455/452.2 |
| 2013/0303169 A1 | 11/2013 | Iwamura | |
| 2014/0286187 A1* | 9/2014 | Mochizuki | H04W 36/18 370/252 |
| 2016/0198355 A1* | 7/2016 | Wang | H04W 24/08 370/252 |

OTHER PUBLICATIONS

3GPP TS 36.331 V12.0.0, "3$^{rd}$ Generation Partnership Project; Technical Specification Group Radio Access Network; Evolved Universal Terrestrial Radio Access (E-UTRA); Radio Resource Control (RRC); Protocol specification (Release 12)," Dec. 2013, 8 pages.
International Search Report dated Aug. 26, 2014, for corresponding International Application No. PCT/JP2014/002881, 3 pages.

* cited by examiner

TERMINAL, BASE STATION, RECEPTION QUALITY REPORTING METHOD, AND DATA TRANSMISSION STATE SWITCHING METHOD

TECHNICAL FIELD

The present invention relates to a terminal, a base station, a reception-quality reporting method, and a data-transmission-state switching method.

BACKGROUND ART

Currently, 3GPP has been conducting studies on Long Term Evolution (LTE)-Advanced, which is an advanced version of LTE. In LTE-Advanced, a heterogeneous network (HetNet) has been examined as a technique to satisfy system performance requirements such as spectral efficiency (system capacity) and energy saving of base stations (each may be called an "eNB"). In HetNet, in addition to the cell arrangement around a macro cell, which is a traditional high transmission-power base station, as the center of the network, a cell which is a low transmission-power base station such as a picocell or femtocell (small cell) is disposed in a macro cell (see, e.g., Non-Patent Literature (hereinafter, referred to as "NPL" 1). Small cells are each used as a radio interface that efficiently provides coverage for a local area such as an indoor facility where a large amount of traffic is generated in a concentrated manner, for example.

In arrangement of a large number of small cells for supporting the traffic expected to continue increasing, techniques to control switching between a state where a small cell temporarily stops transmission processing (OFF state) and a state where a small cell performs transmission processing (ON state) have been examined for the purpose of reducing power consumption of a base station on the network side or alleviating interference from a small cell.

Figure 1:
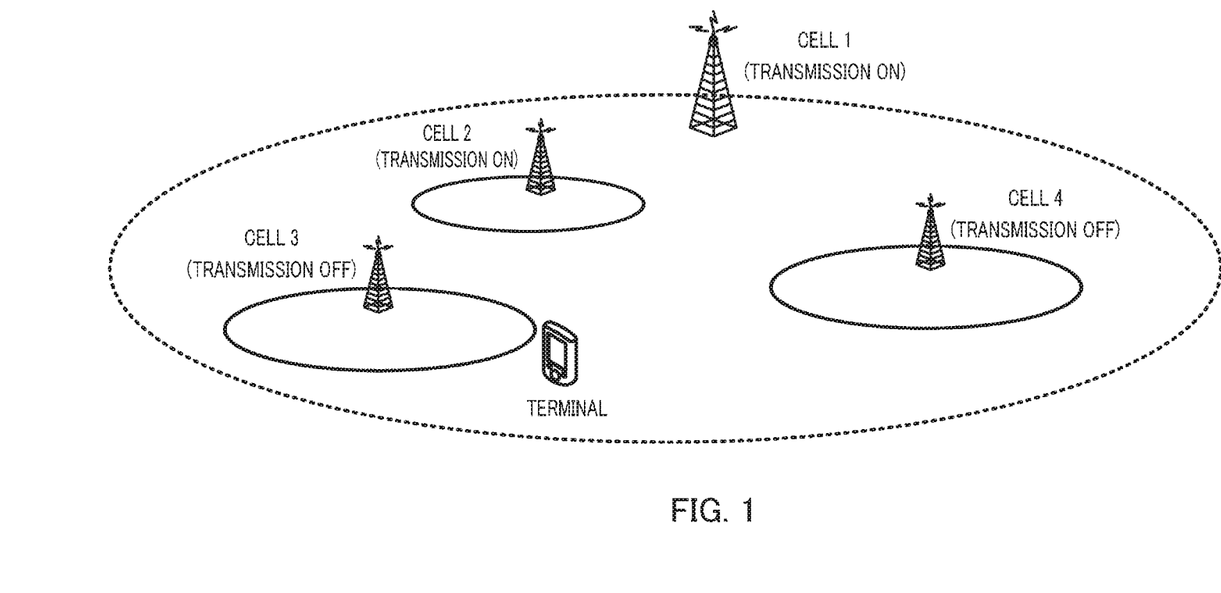
FIG. 1 is a diagram illustrating a configuration example of a communication system including ON-state or OFF-state cells.

For example, when the traffic of a base station (macro-cell) is high, transmission from a small cell starts (turn on transmission) to off-load the traffic to the small cell. Meanwhile, when the traffic of a base station is low, transmission from a small cell is stopped (turn off transmission). The operation to achieve power saving and reduction of interference to a neighboring cell by a small cell is expected. For example, FIG. 1 illustrates a configuration of a communication system in which cells 2 to 4 (which are small cells) are disposed in the coverage area of cell 1 (which is a macro-cell). In FIG. 1, cells 1 and 2 are cells performing transmission (hereinafter, referred to as an "ON-state cell") while cells 3 and 4 are cells stopping transmission (hereinafter, referred to as an "OFF-state cell").

The network side that controls switching between the ON-state and OFF-state of a small cell determines which one of OFF-state cells is to be configured to an ON-state, based on a reception-quality measurement-result (may be called a "measurement report") reported from a terminal (may be called a "UE") (i.e., using the report from a terminal as a trigger for switching between the ON and OFF states). When transmission of all signals from the OFF-state cells is stopped, the terminal can no longer detect the OFF-state cells. For this reason, in order to allow the terminal to detect the OFF-state cells, the OFF-state cells transmit a signal for the terminal to detect the base stations (cell-detection-signal (may be called a "discovery signal")). Upon detection of a cell (base station) using the cell-detection-signal, the terminal reports, to the network side, a reception-quality measurement-result acquirable using the measured reception quality for the cell.

3GPP has been studying use of a new cell-detection-signal (may be called a "new cell-detection-signal" hereinafter), which has a higher detection accuracy than the traditional cell-detection-signal (may be called an "old cell-detection-signal" hereinafter), as a cell-detection-signal transmitted from an OFF-state cell.

This new cell-detection-signal is expected to have no backward compatibility. For this reason, a traditional terminal (e.g., terminal supporting LTE Release 11 or before Release 11) cannot detect a base station using the new cell-detection-signal. As a result, since the traditional terminal cannot detect an OFF-state cell, the terminal cannot measure the reception quality of the OFF-state cell to trigger switching the OFF-state cell to the ON state on the network side. Meanwhile, a new terminal (e.g., terminal supporting LTE Release 12) can detect a base station using the new cell-detection-signal transmitted from an OFF-state cell and measure the reception quality of the base station. For this reason, the new terminal can trigger switching the OFF-state cell to the ON-state on the network side.

In addition, 3GPP has been studying a technique for a terminal to add an offset value to a reception-quality measurement-value in order for the terminal to execute a handover to a specific cell soon (e.g., NPL 2). When a reporting condition for reporting a reception-quality measurement-result to a cell (serving cell) to which the terminal is connected is satisfied, the terminal reports the reception-quality measurement-result. In this case, use of the reception-quality measurement-result acquirable by adding an offset value to the reception-quality measurement-value of the cell measured by the terminal makes it possible to satisfy the reporting condition soon as compared with the case where the reception-quality measurement-value is used alone. Thus, the serving cell can trigger a handover soon based on the reception-quality measurement-result reported from the terminal. This offset value is configured for each cell and the offset values are indicated to each terminal using terminal-specific signaling.

CITATION LIST

Patent Literature

NPL 1
3GPP TR 36.872 V1.0.0 (2013-08), Small Cell Enhancements for E-UTRA and E-UTRAN-Physical layer Aspects
NPL 2
3GPP TS 36.331 V12.0.0 (2013-12), "Evolved Universal Terrestrial Radio Access (E-UTRA); Radio Resource Control (RRC); Protocol specification (Release 12)"

SUMMARY OF INVENTION

Technical Problem

In the related art, a base station indicates, to a terminal, a single offset value for a single cell. Meanwhile, when control to switch between the ON-state and OFF-state of a cell is applied, the base station needs to indicate, to the terminal, an offset value appropriate to a change in the transmission state (ON-state/OFF-state) of each cell, so that the overhead for terminal-specific signaling increases. Meanwhile, it may be possible to previously assign two kinds of offset values used in the ON and OFF states, respectively. However, indicating these offset values to the terminal causes an increase in the overhead for terminal-specific signaling.

An object of the present invention is thus to provide a terminal, a base station, a reception-quality reporting method, and a data-transmission-state switching method enabling control to switch between the ON and OFF states of a cell without any increase in overhead for signaling to a terminal.

Solution to Problem

A terminal according to an aspect of the present invention includes: a cell-detection-signal receiving section that receives a first cell-detection-signal transmitted from a first base station performing data transmission and a second cell-detection-signal transmitted from a second base station stopping data transmission; a measurement section that measures, using the first or the second cell-detection-signal, reception quality of signals transmitted from a plurality of base stations including the first and the second base stations to acquire reception-quality measurement-values; a configuration-information receiving section that receives first configuration information indicating a plurality of first offset values to be added respectively to the reception-quality measurement-values of the plurality of base stations and second configuration information on a second offset value to be added commonly to a reception-quality measurement-value of the second base station; a base-station state determining section that determines, using the first and the second cell-detection-signals, whether a measurement-target base station for which reception quality is to be measured is the first base station or is the second base station; and a measurement-result report determining section that calculates, when the measurement-target base station is the second base station, a reception-quality measurement-result by adding the first offset value corresponding to the measurement-target base station and the second offset value to a reception-quality measurement-value of the measurement-target base station and determines whether to report the reception-quality measurement-result.

A terminal according to an aspect of the present invention includes: a cell-detection-signal receiving section that receives a first cell-detection-signal transmitted from a first base station performing data transmission and a second cell-detection-signal transmitted from the first base station and a second base station stopping data transmission; a measurement section that measures, using the first or the second cell-detection-signal, reception quality of signals transmitted from a plurality of base stations including the first and the second base stations to acquire reception-quality measurement-values; a base-station state determining section that determines, using the first and the second cell-detection-signals, whether a measurement-target base station for which reception quality is to be measured is the first base station or is the second base station; and a measurement-result report determining section that calculates, when the measurement-target base station is the second base station, a reception-quality measurement-result by adding, to a reception-quality measurement-value of the measurement-target base station, an offset value corresponding to the measurement-target base station among a plurality of first offset values to be added respectively to the reception-quality measurement-values of the plurality of base stations and a second offset value to be added commonly to the reception-quality measurement-value of the second base station, and determines whether to report the reception-quality measurement-result.

A base station according to an aspect of the present invention includes: a configuration-information transmitting section that transmits first configuration information and second configuration information, the first configuration information indicating a plurality of first offset values to be added respectively to reception-quality measurement-values indicating reception quality of signals transmitted from a plurality of base stations including a first base station performing data transmission and a second base station stopping data transmission, the second configuration information being information on a second offset value to be added commonly to a reception-quality measurement-value of the second base station; a cell-detection-signal transmitting section that transmits, when data transmission is performed, both a first cell-detection-signal and a second cell-detection-signal, and transmits, when data transmission is stopped, only the second cell-detection-signal; a reception section that receives a reception-quality measurement-result for the second base station transmitted from a terminal, the reception-quality measurement-result being acquirable by adding the first offset value and the second offset value to the reception-quality measurement-value of the second base station; and a switching determination section that determines whether to cause the second base station to start data transmission based on the reception-quality measurement-result.

A reception-quality reporting method according to an aspect of the present invention includes: receiving a first cell-detection-signal transmitted from a first base station performing data transmission and a second cell-detection-signal transmitted from the first base station and a second base station stopping data transmission; measuring, using the first or the second cell-detection-signal, reception quality of signals transmitted from a plurality of base stations including the first and the second base stations to acquire reception-quality measurement-values; receiving first configuration information indicating a plurality of first offset values to be added respectively to the reception-quality measurement-values of the plurality of base stations and second configuration information on a second offset value to be added commonly to a reception-quality measurement-value of the second base station; determining, using the first and the second cell-detection-signals, whether a measurement-target base station for which reception quality is to be measured is the first base station or is the second base station; and calculating, when the measurement-target base station is the second base station, a reception-quality measurement-result by adding the first offset value corresponding to the measurement-target base station and the second offset value to a reception-quality measurement-value of the measurement-target base station, and determining whether to report the reception-quality measurement-result.

A reception-quality reporting method according to an aspect of the present invention includes: receiving a first cell-detection-signal transmitted from a first base station performing data transmission and a second cell-detection-signal transmitted from the first base station, and a second base station stopping data transmission; measuring, using the first or the second cell-detection-signal, reception quality of signals transmitted from a plurality of base stations including the first and the second base stations to acquire reception-quality measurement-values; determining, using the first and the second cell-detection-signals, whether a measurement-target base station for which reception quality is to be measured is the first base station or is the second base station; and calculating, when the measurement-target base station is the second base station, a reception-quality measurement-result by adding, to a reception-quality measurement-value of the measurement-target base station, an offset value corresponding to the measurement-target base station among a plurality of first offset values to be added respectively to the reception-quality measurement-values of the plurality of base stations and a second offset value to be added commonly to the reception-quality measurement-value of the second base station, and determining whether to report the reception-quality measurement-result.

A data-transmission-state switching method according to an aspect of the present invention includes: transmitting first configuration information and second configuration information, the first configuration information indicating a plurality of first offset values to be added respectively to reception-quality measurement-values indicating reception quality of signals transmitted from a plurality of base stations including a first base station performing data transmission and a second base station stopping data transmission, the second configuration information being information on a second offset value to be added commonly to a reception-quality measurement-value of the second base station; transmitting, when data transmission is performed, both a first cell-detection-signal and a second cell-detection-signal, and transmitting, when data transmission is stopped, only the second cell-detection-signal; receiving a reception-quality measurement-result for the second base station transmitted from a terminal, the reception-quality measurement-result being acquirable by adding the first offset value and the second offset value to the reception-quality measurement-value of the second base station; and determining whether to cause the second base station to start data transmission based on the reception-quality measurement-result.

Advantageous Effects of Invention

According to the present invention, it is made possible to control switching between the ON and OFF states of a cell without any increase in overhead for signaling to a terminal.

DESCRIPTION OF EMBODIMENTS

Hereinafter, a description will be given of embodiments of the present invention with reference to the accompanying drawings.

Embodiment 1

[Summary of Communication System]

A communication system according to Embodiment 1 includes base station 100 and terminal 200. This communication system employs, for example, a configuration in which a plurality of small cells is disposed in a macro-cell as in the communication system illustrated in FIG. 1. In this case, base station 100 is any of a plurality of cells including a macro-cell and small cells, and terminal 200 is a terminal connecting to any of the cells.

In Embodiment 1, base station 100 operates while switching between the ON-state and OFF-state. Base station 100 performs data transmission during the ON-state and stops data transmission during the OFF-state. Furthermore, base station 100 transmits a new cell-detection-signal and an old cell-detection-signal to terminal 200 during the ON-state while transmitting a new cell-detection-signal to terminal 200 during the OFF-state. Terminal 200 is a new terminal capable of detecting the new cell-detection-signal. Meanwhile, the old cell-detection-signal is a synchronization signal, for example.

[Configuration of Base Station 100]

Figure 2:
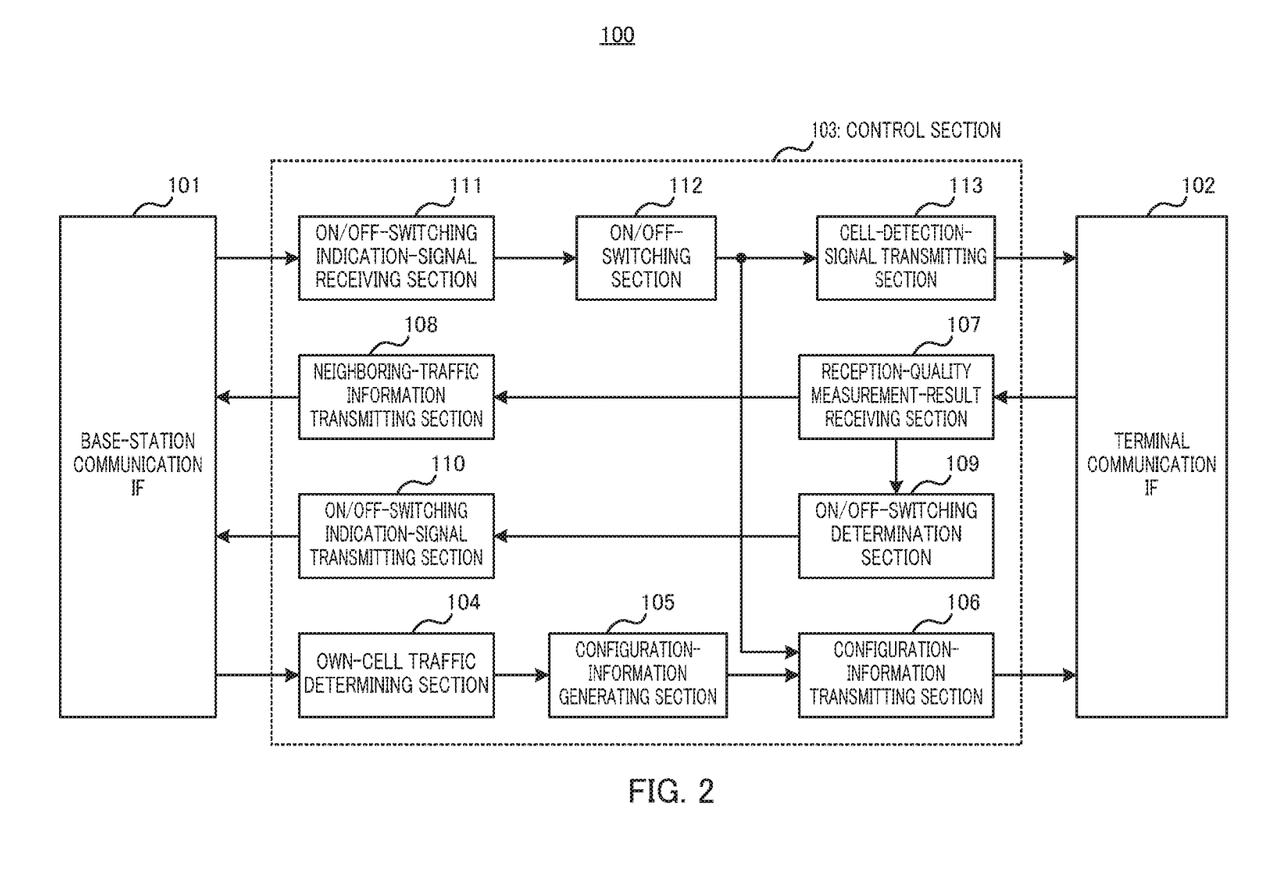
FIG. 2 is a block diagram illustrating a configuration of a base station according to Embodiment 1 of the present invention.

FIG. 2 is a block diagram illustrating a configuration of base station 100 according to Embodiment 1. In FIG. 2, base station 100 includes base-station communication interface (IF) 101, terminal communication IF 102, and control section 103.

Base-station communication IF 101 is an interface for performing communication between base station 100 and another base station.

Terminal communication IF 102 is an interface for performing communication between base station 100 and terminal 200.

Control section 103 performs control on switching processing between the ON and OFF states of each base station. Control section 103 illustrated in FIG. 2 includes own-cell traffic determining section 104, configuration-information generating section 105, configuration-information transmitting section 106, reception-quality measurement-result receiving section 107, neighboring-traffic information transmitting section 108, ON/OFF-switching determination section 109, ON/OFF-switching indication-signal transmitting section 110, ON/OFF-switching indication-signal receiving section 111, ON/OFF-switching section 112, and cell-detection-signal transmitting section 113.

Own-cell traffic determining section 104 measures a radio traffic amount in base station 100 and determines whether the radio traffic amount exceeds a predetermined threshold (whether it is high traffic). Own-cell traffic determining section 104 then outputs the information indicating, whether it is high traffic, to configuration-information generating section 105. For example, own-cell traffic determining section 104 may determine whether the number of terminals connecting to base station 100 and thus being in a communication state exceeds a predetermined threshold and determines it is high traffic when the number of terminals exceeds the threshold. Furthermore, own-cell traffic determining section 104 may determine that it is high traffic when the number of resource blocks (RBs) having an interference-level equal to or greater than a predetermined threshold exceeds, using signaling information (overload indicator) exchanged between base stations via base-station communication IF 101 and indicating an interference level from a neighboring cell for each of the RBs. For example, the overload indicator indicates three stages (high, middle, and low) of interference level for each RB. In this case, own-cell traffic determining section 104 determines that it is high traffic when the number of RBs having a high interference-level exceeds a predetermined threshold.

Configuration-information generating section 105 generates configuration information to be indicated to terminal 200 and outputs the generated configuration information to configuration-information transmitting section 106. For example, configuration-information generating section 105 generates configuration information including a traditional offset value to be added to a reception-quality measurement-value of each cell for handover in terminal 200. This traditional offset value is configured for each cell. In addition, upon receipt of information indicating that it is high traffic from own-cell traffic determining section 104, configuration-information generating section 105 generates configuration information including a new offset value to be added commonly to reception-quality measurement-values of OFF-state cells in terminal 200. The new offset value is an offset value required for terminal 200 to detect an OFF-state cell soon and to measure the reception quality.

Configuration-information transmitting section 106 transmits the configuration information received from configuration-information generating section 105 to terminal 200 via terminal communication IF 102. More specifically, configuration-information transmitting section 106 transmits the configuration information indicating the traditional offset value by including the information in a terminal-specific signal with respect to terminal 200. Configuration-information transmitting section 106 transmits the configuration information indicating the new offset value by including the information in a broadcast signal. Note that, configuration-information transmitting section 106 transmits the configuration information when the information received from ON/OFF switching section 112 is the ON-state and stops transmission of the configuration information when the information received from ON/OFF switching section 112 is the OFF-state.

Reception-quality measurement-result receiving section 107 receives, via terminal communication IF 102, the reception-quality measurement-result reported from terminal 200. Reception-quality measurement-result receiving section 107 outputs the received reception-quality measurement-result to neighboring-traffic information transmitting section 108 and ON/OFF-switching determination section 109.

Neighboring-traffic information transmitting section 108 determines an interference level given by base station 100 to another cell in the neighborhood of base station 100, using the reception-quality measurement-result received from reception-quality measurement-result receiving section 107 and generates signaling information indicating the result of determination (neighboring traffic information). The signaling information is, for example, information indicating the interference level from a neighboring cell of each RB (overload indicator). Neighboring-traffic information transmitting section 108 transmits the generated signaling information (neighboring traffic information) to another base station via base-station communication IF 101.

ON/OFF-switching determination section 109 determines which cell is to be switched from the OFF-state to the ON-state, based on the reception-quality measurement-result received from reception-quality measurement-result receiving section 107. For example, upon reception of reception-quality measurement-results corresponding to a plurality of cells, ON/OFF-switching determination section 109 may determine that the cell having the highest reception-quality measurement-result (having the best reception quality) is to be switched to the ON-state. ON/OFF-switching determination section 109 outputs the determination result indicating the cell to be switched to the ON-state to ON/OFF-switching indication-signal transmitting section 110.

Determining whether to switch the transmission states of base station 100 and another cell from the ON-state to OFF-state may be performed by base station 100, or may be performed by a core-network apparatus that controls base station 100 and/or the like.

ON/OFF-switching indication-signal transmitting section 110 transmits an indication signal for indicating switching to the ON-state to another cell determined to be switched to the ON-state in ON/OFF-switching determination section 109 to the other cell via base-station communication IF 101.

ON/OFF-switching indication-signal receiving section 111 receives, via base-station communication IF 101, the indication signal for indicating switching to the ON-state, which is indicated by the other cell. ON/OFF-switching indication-signal receiving section 111 outputs the received indication signal to ON/OFF switching section 112.

ON/OFF switching section 112 switches between the ON-state and OFF-state as the transmission state of base station 100. For example, ON/OFF switching section 112 switches the transmission state of base station 100 to the ON-state in accordance with the indication signal received from ON/OFF-switching indication-signal receiving section 111. Moreover, ON/OFF switching section 112 switches the transmission state of base station 100 to the OFF-state in accordance with the indication signal indicated from a core-network apparatus. ON/OFF switching section 112 outputs the transmission state (ON-state or OFF-state) of base station 100 to configuration-information transmitting section 106 and cell-detection-signal transmitting section 113.

Cell-detection-signal transmitting section 113 generates a cell-detection-signal based on the transmission state of base station 100 received from ON/OFF switching section 112 and transmits the generated cell-detection-signal to terminal 200 via terminal communication IF 102. More specifically, cell-detection-signal transmitting section 113 transmits both a new cell-detection-signal and an old cell-detection-signal to terminal 200 when base station 100 is in the ON-state. Meanwhile, cell-detection-signal transmitting section 113 transmits only a new cell-detection-signal to terminal 200 when base station 100 is in the OFF-state.

[Configuration of Terminal 200]

Figure 3:
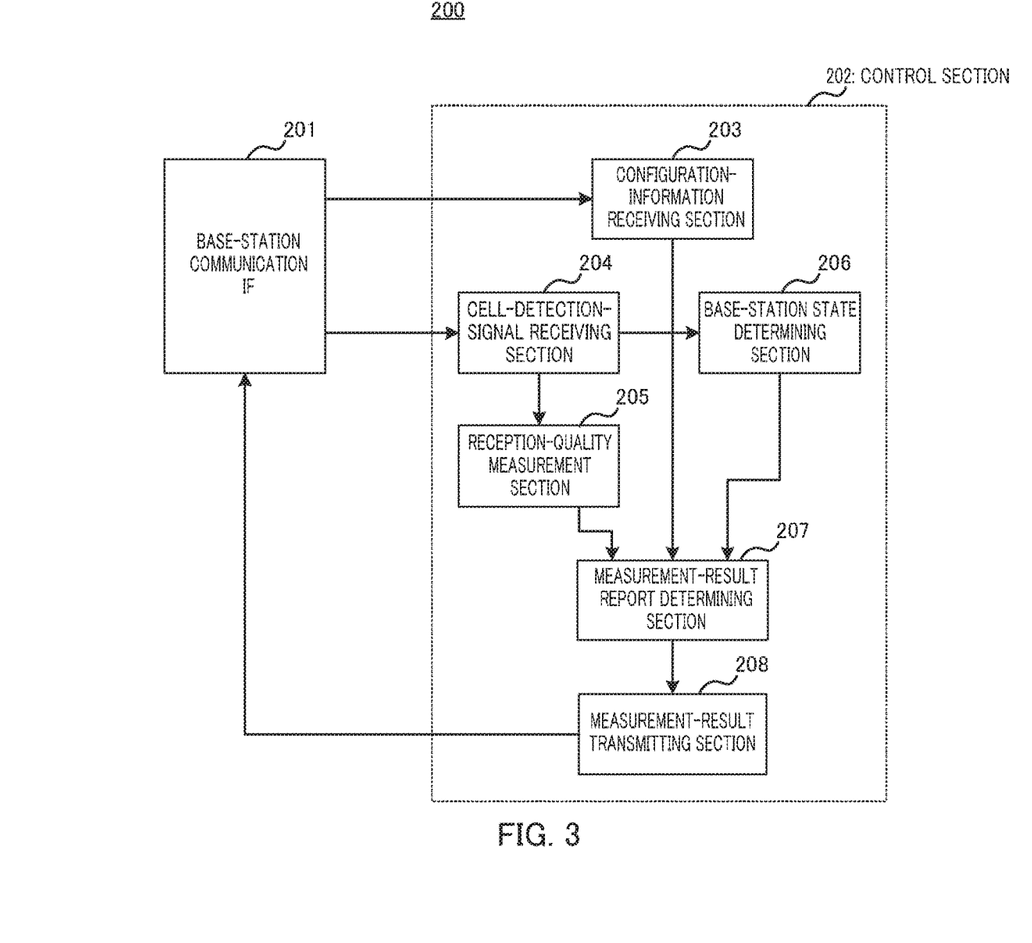
FIG. 3 is a block diagram illustrating a configuration of a terminal according to Embodiment 1 of the present invention.

FIG. 3 is a block diagram illustrating a configuration of terminal 200 according to Embodiment 1. In FIG. 3, terminal 200 includes base-station communication IF 201 and control section 202.

Base-station communication IF 201 is an interface for performing communication between base station 100 and terminal 200.

Control section 202 performs control on generating and transmission processing of a reception-quality measurement-result of each cell. Control section 202 illustrated in FIG. 3 includes configuration-information receiving section 203, cell-detection-signal receiving section 204, reception-quality measurement section 205, base-station state determining section 206, measurement-result report determining section 207, and measurement-result transmitting section 208.

Configuration-information receiving section 203 receives the configuration information transmitted from base station 100 via base-station communication IF 201. For example, the configuration information included in a terminal-specific signal for terminal 200 includes a traditional offset value used in reception quality measurement performed by terminal 200. Moreover, the configuration information included in a broadcast signal for a plurality of terminals including terminal 200 includes a new offset value used in reception quality measurement performed by terminal 200. Configuration-information receiving section 203 outputs the received configuration information (offset value) to measurement-result report determining section 207.

Cell-detection-signal receiving section 204 receives, via base-station communication IF 201, the cell-detection-signal transmitted from each of the plurality of cells including base station 100 and outputs the received cell-detection-signal to reception-quality measurement section 205 and base-station state determining section 206. More specifically, cell-detection-signal receiving section 204 receives a new cell-detection-signal transmitted from an ON-state cell and an OFF-state cell and receives an old cell-detection-signal transmitted from an ON-state cell.

Reception-quality measurement section 205 measures the reception quality of a signal transmitted from each cell, using the cell-detection-signal received in cell-detection-signal receiving section 204 to obtain a reception-quality measurement-value. Reception-quality measurement section 205 outputs the obtained reception-quality measurement-value to measurement-result report determining section 207. Examples of the reception-quality measurement-value include reference signal received quality (RSRQ) and reference signal received power (RSRP).

Base-station state determining section 206 detects the cell that has transmitted the cell-detection-signal by using the cell-detection-signal received from cell-detection-signal receiving section 204. Subsequently, base-station state determining section 206 determines the transmission state (either ON-state base station or OFF-state base station) of the cell (base station) detected as the base station that has transmitted the cell-detection-signal, using the cell-detection-signal (old cell-detection-signal and new cell-detection-signal). For example, when a new cell-detection-signal is detected, base-station state determining section 206 performs detection processing of a synchronization signal which is the old cell-detection-signal. When detecting a synchronization signal, base-station state determining section 206 determines that the cell is in the ON-state, and when detecting no synchronization signal, base-station state determining section 206 determines that the cell is in the OFF-state. More specifically, base-station state determining section 206 determines a base station detected as having transmitted an old cell-detection-signal to be an ON-state base station and determines a base station detected as having transmitted no old cell-detection-signal to be an OFF-state base station from among the base stations each detected as having transmitted a new cell-detection-signal. Base-station state determining section 206 outputs the determination result of the transmission state of the base station to measurement-result report determining section 207.

Measurement-result report determining section 207 calculates a reception-quality measurement-result of each cell in accordance with the configuration information (offset value) received from configuration-information receiving section 203, the reception-quality measurement-value received from reception-quality measurement section 205, and the transmission state of the base station received from base-station state determining section 206. Measurement-result report determining section 207 determines whether to report the calculated reception-quality measurement-result to a serving cell of terminal 200.

More specifically, when a traditional offset value is configured for an ON-state cell, measurement-result report determining section 207 determines whether a reporting condition is satisfied for the reception-quality measurement-result acquirable by adding a traditional offset value to the reception-quality measurement-value. When no traditional offset value is configured for an ON-state cell, measurement-result report determining section 207 determines whether a reporting condition is satisfied for the reception-quality measurement-value as the reception-quality measurement-result.

Meanwhile, when a traditional offset value is configured for an OFF-state cell, measurement-result report determining section 207 determines whether a reporting condition is satisfied for the reception-quality measurement-result acquirable by adding both a traditional offset value and a new offset value to the reception-quality measurement-value. Regarding an OFF-state cell, when no traditional offset value is configured, measurement-result report determining section 207 determines whether a reporting condition is satisfied for the reception-quality measurement-result acquirable by adding a new offset value to the reception-quality measurement-value.

Note that, the term "when no traditional offset value is configured" is equal to the case where zero is configured as the traditional offset value.

As described above, when a base station that is a target for measuring reception quality is an OFF-state base station, measurement-result report determining section 207 calculates a reception-quality measurement-result by adding a traditional offset value and a new offset value to the reception-quality measurement-value of the base station and determines whether to report the reception-quality measurement-result.

As a reporting condition, it may be determined to report the reception-quality measurement-result when the reception-quality measurement-result of the determination target cell is greater than a threshold, for example. Alternatively, as a reporting condition, it may be determined to report the reception-quality measurement-result when the reception-quality measurement-result of the determination target cell is greater than a reception-quality measurement-result of the cell to which terminal 200 is connected (serving cell), for example. Stated differently, addition of the traditional offset value or new offset value to the reception-quality measurement-value makes it easier to satisfy the reporting condition mentioned above in measurement-result report determining section 207.

Measurement-result transmitting section 208 transmits a reception-quality measurement-result of the cell that has satisfied the reporting condition in measurement-result report determining section 207 to base station 100 via base-station communication IF 201.

[Operations of Base Station 100 and Terminal 200]

Operations of base station 100 and terminal 200 each having the configuration described above will be described.

Figure 4:
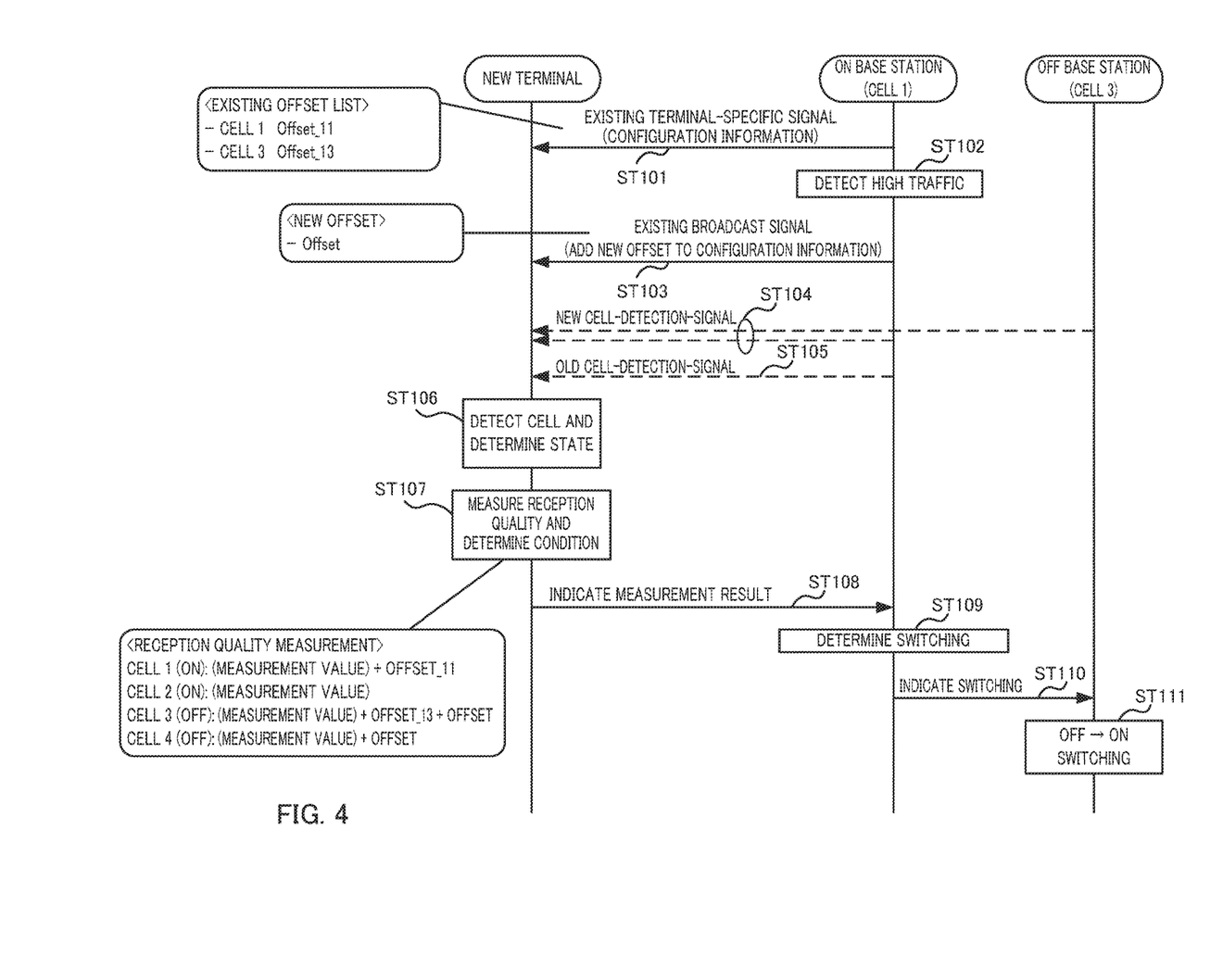
FIG. 4 is a sequence diagram illustrating operations of the base station and terminal according to Embodiment 1 of the present invention.

FIG. 4 is a sequence diagram illustrating an operation to determine which OFF-state base station (hereinafter referred to as an "OFF base station") is switched to the ON-state when high traffic is detected in an ON-state base station (hereinafter referred to as an "ON base station").

In FIG. 4, a description will be given of the communication system illustrated in FIG. 1, for example. More specifically, cells 1 to 4 are disposed in FIG. 4, and cells 1 and 2 are ON base stations while cells 3 and 4 are OFF base stations. In FIG. 4, a new terminal capable of detecting a new cell-detection-signal (hereinafter, simply referred to as "terminal") is connected to cell 1. Cells 1 to 4 herein each include the configuration of base station 100 (FIG. 2), for example, while the new terminal includes the configuration of terminal 200 (FIG. 3), for example.

In FIG. 4, cell 1 transmits configuration information to a terminal using an existing terminal-specific signal in ST 101. This configuration information includes an offset list indicating existing offset values, for example. This offset list includes a plurality of offset values to be added respectively to reception-quality measurement-values of a plurality of base stations including ON-state and OFF-state base stations. For example, in the existing offset list illustrated in FIG. 4, offset values Offset 11 and Offset 13 for the reception-quality measurement-values of cells 1 and 3 are respectively configured. An assumption is made that no offset value is configured yet for reception-quality measurement-values of cells 2 and 4 in the terminal illustrated in FIG. 4.

In ST 102, cell 1 measures a radio traffic amount of cell 1 and detects that cell 1 has high traffic.

When detecting an increase in the radio traffic amount (high traffic), cell 1 needs to cause a terminal to execute detection of an OFF-state cell and reception-quality measurement in order to determine which cell needs to be switched to an ON-state from among OFF-state cells. In this respect, when detecting high traffic in ST 102, cell 1 transmits the configuration to the terminal using an existing broadcast signal in ST 103. This configuration information includes new offset value Offset to be added commonly to the reception-quality measurement-values of the OFF-state base stations. Stated differently, when the traffic amount of the base station (cell 1) to which the terminal is connected exceeds a threshold (in case of high traffic), the configuration information including the new offset value is indicated to the terminal by cell 1.

In ST 104, cell 1, which is an ON base station, and cell 3, which is an OFF base station, transmit a new cell-detection-signal to a terminal. In addition, cells 2 and 4 (not illustrated) also transmit a new cell-detection-signal to a terminal.

In ST 105, cell 1, which is an ON base station, transmits an old cell-detection-signal to a terminal. Likewise, cell 2 (ON base station, not illustrated) transmits an old cell-detection-signal to a terminal.

In ST 106, the terminal detects cells 1 to 4 using the cell-detection-signals received in ST 104 or ST 105. The terminal determines the transmission states (ON-state or OFF-state) of the detected cells using the cell-detection-signals. The terminal determines that cells 1 and 2 from which both a new cell-detection-signal and an old cell-detection-signal have been detected are in the ON-state, and determines that cells 3 and 4 from which only a new cell-detection-signal has been detected are in the OFF-state.

In ST 107, the terminal measures the reception quality using the cell-detection-signals received in ST 104 or ST 105. Moreover, the terminal calculates reception-quality measurement-results by adding the offset values received in ST 101 or ST 102 to the reception-quality measurement-values based on the determination results in ST 106. The terminal then determines whether to report the reception-quality measurement-results to cell 1, which is the serving cell (whether to satisfy the reporting condition).

More specifically, since existing offset value Offset_11 is configured for cell 1 and cell 1 is also in the ON-state, the terminal configures the value obtained by adding Offset_11 to the reception-quality measurement-value of cell 1 to be the reception-quality measurement-result of cell 1. Moreover, since no existing offset value is configured for cell 2 and cell 2 is in the ON-state, the terminal configures the reception-quality measurement-value of cell 2 itself to be the reception-quality measurement-result of cell 2.

Moreover, since existing offset value Offset_13 is configured for cell 3 and cell 3 is in the OFF-state, the terminal configures the value obtained by adding Offset_11 and new Offset value Offset to the reception-quality measurement-value of cell 3 to be the reception-quality measurement-result of cell 3. Moreover, since no existing offset value is configured for cell 4 and cell 4 is in the OFF-state, the terminal configures the value obtained by adding new offset value Offset to the reception-quality measurement-value of cell 4 to be the reception-quality measurement-result of cell 4.

Furthermore, in FIG. 4, the terminal determines that the reception-quality measurement-result of cell 3 satisfies the reporting condition. Thus, the terminal indicates the reception-quality measurement-result of cell 3 to cell 1 in ST 108.

In ST 109, cell 1 determines whether to switch cell 3 from the OFF-state to the ON-state based on the reception-quality measurement-result of cell 3 indicated by the terminal in ST 108. More specifically, cell 1 determines whether to start data transmission to cell 3 in the OFF-state based on the reception-quality measurement-result of cell 3 in the OFF-state (value acquirable by adding the traditional offset value and new offset value to the reception-quality measurement-value) transmitted from the terminal. Cell 1 herein determines switching of cell 3 to the ON-state.

In ST 110, cell 1 indicates, to cell 3, a switching instruction for cell 3 to switch to the ON-state.

Upon reception of the switching instruction in ST 110, cell 3 switches from the ON-state to the OFF-state in ST 111.

As described above, in FIG. 4, it is made possible to handover the terminal to cell 3 in the ON-state, thus enabling a reduction in the radio traffic amount of cell 1.

Accordingly, in Embodiment 1, when calculating a reception-quality measurement-result of an OFF-state base station, terminal 200 uses a new offset value in addition to an existing offset value. Thus, in terminal 200, it is made possible for the reception-quality measurement-result of an OFF-state cell to more easily satisfy the reporting condition, by using an offset value for an OFF-state base station in addition to an existing offset value configured for each base station. More specifically, terminal 200 reports the reception-quality measurement-result of the OFF-state cell to base station 100 soon to allow base station 100 to switch the OFF-state cell to the ON-state soon.

In addition, the new offset value to be added to the reception-quality measurement-value of an OFF-state cell is not indicated as a value for each cell as in the case of existing offset values, but is indicated as a value common to all the OFF-state cells. For this reason, the signaling amount required for indicating a new offset value can be small as compared with the signaling amount required for indicating the existing offset value for each cell.

Furthermore, base station 100 indicates a new offset value to terminal 200 using a broadcast signal. Accordingly, the new offset value can further reduce the signaling amount as compared with the existing offset value.

Furthermore, when the radio traffic amount in base station 100 exceeds the threshold, i.e., when base station 100 detects its high traffic, base station 100 indicates a new offset value to be applied to the reception-quality measurement-result of an OFF-state base station to the terminal. Stated differently, base station 100 indicates a new offset value to terminal 200 only at an appropriate timing in accordance with the traffic state of base station 100 (at a timing to offload the traffic to another cell). More specifically, the new offset value is indicated only at a timing when it is necessary to determine which OFF-state cell is to be switched to the ON-state. Accordingly, the signaling required for indicating a new offset value to terminal 200 can be a minimum required amount. Moreover, according to this embodiment, an OFF-state cell can be switched to the ON-state only at the timing when the traffic needs to be offloaded to another cell, so that power saving by switching each cell to be in the OFF-state can be achieved while the radio quality of terminal 200 is maintained.

As described above, according to Embodiment 1, switching between the ON and OFF states of cells can be controlled without any increase in overhead for signaling to terminal 200.

Embodiment 2

In Embodiment 1, the case has been described where a new offset value is indicated to a terminal from a base station using a broadcast signal. In contrast to this, in Embodiment 2, a description will be given of a case where a terminal previously holds a new offset value, and a flag indicating the presence or absence of application of the new offset value is indicated to the terminal from the base station using a broadcast signal.

Note that, the base station according to Embodiment 2 has a basic configuration common to base station 100 according to Embodiment 1, so that the description will be given with reference to FIG. 2 also in Embodiment 2.

In base station 100 according to Embodiment 2, upon reception of the information indicating high traffic from own-self traffic determining section 104, configuration-information generating section 105 generates configuration information including a flag indicating application of a new offset value in terminal 300.

Figure 5:
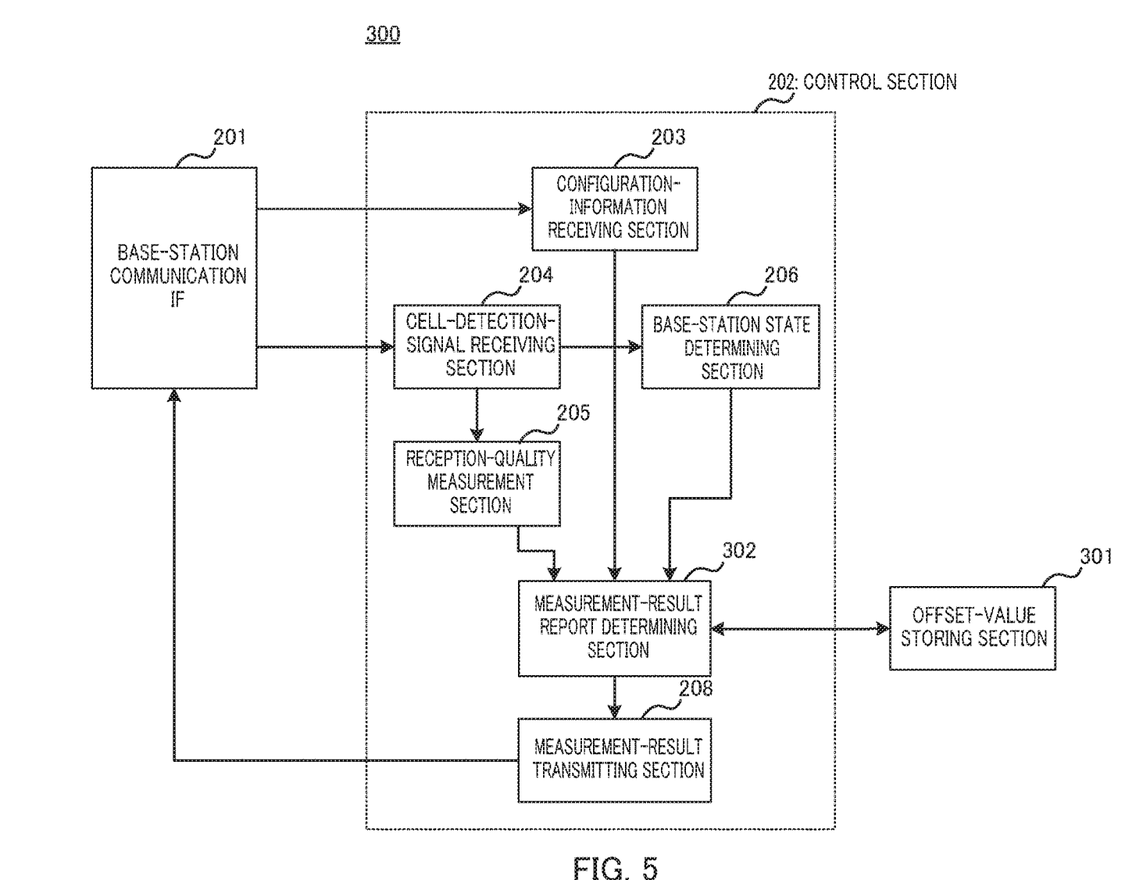
FIG. 5 is a block diagram illustrating a configuration of a terminal according to Embodiment 2 of the present invention.

FIG. 5 is a block diagram illustrating a configuration of terminal 300 according to Embodiment 2. Note that, in FIG. 5 constituent elements identical to those in Embodiment 1 (FIG. 3) are assigned the identical reference numerals, and the descriptions of the identical constituent elements are not repeated.

In terminal 300, offset-value storing section 301 previously stores a new offset value to be added to a reception-quality measurement-value of an OFF-state cell.

When the configuration information received from configuration-information receiving section 203 includes a flag indicating application of a new offset value, measurement-result report determining section 302 acquires a new offset value from offset-value storing section 301. As in Embodiment 1, measurement-result report determining section 302 calculates a reception-quality measurement-result using a new offset value (and existing offset value) previously held in offset-value storing section 301 on a reception-quality measurement-value of an OFF-state cell.

Figure 6:
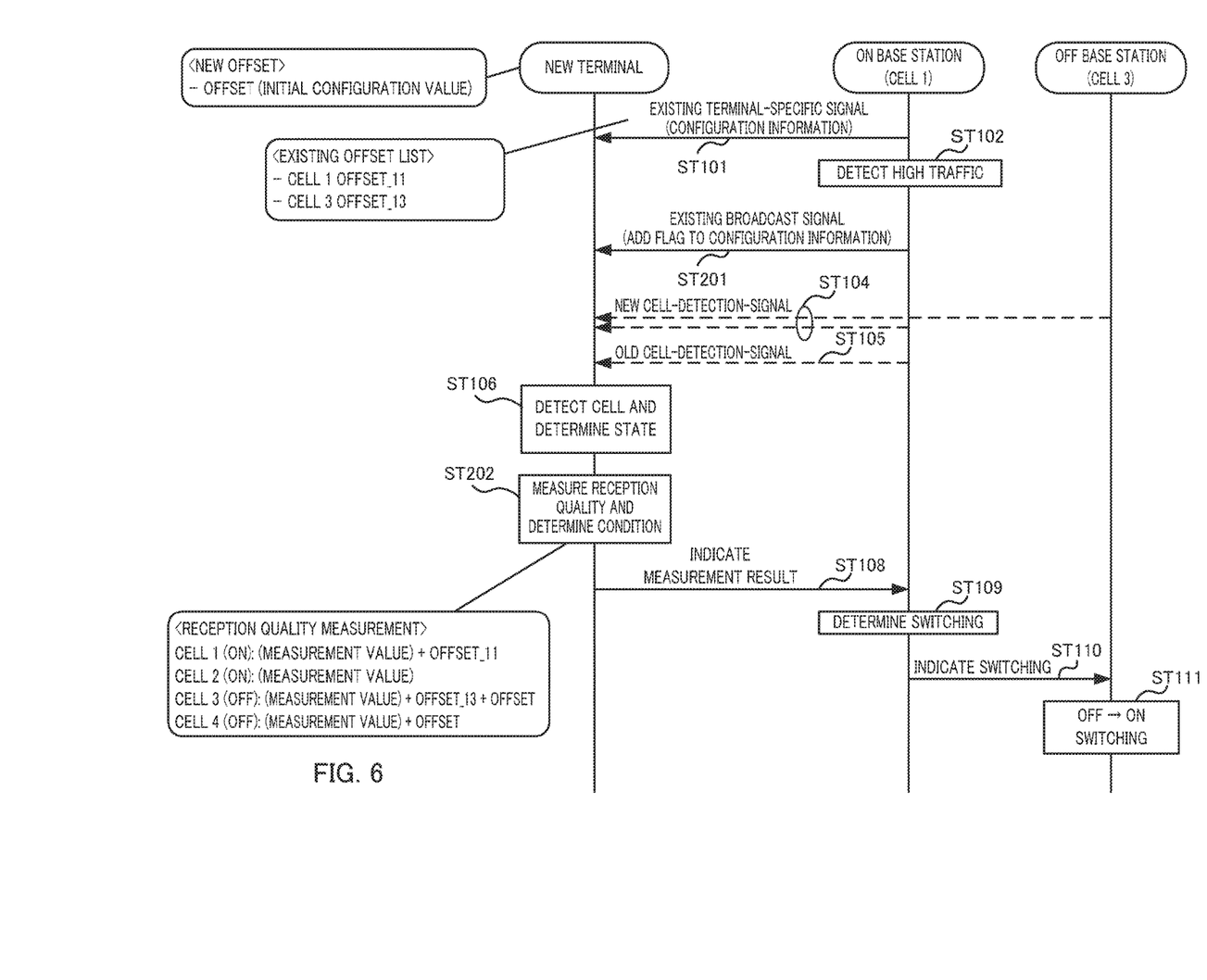
FIG. 6 is a sequence diagram illustrating operations of a base station and the terminal according to Embodiment 2 of the present invention.

FIG. 6 is a sequence diagram illustrating an operation to determine which OFF-state base station is switched to the ON-state when high traffic is detected in an ON-state base station according to Embodiment 2.

Note that, the steps for operations identical to the steps in Embodiment 1 (FIG. 4) are assigned the same reference numerals, and the descriptions for the identical steps will not be repeated in FIG. 6.

As illustrated in FIG. 6, a terminal (new terminal) previously holds new offset value Offset (initial configuration value) to be added commonly to reception-quality measurement-values of OFF-state cells.

When detecting that cell 1 has high traffic in ST 102, cell 1 transmits configuration information to a terminal using an existing broadcast signal in ST 201. This configuration information includes a flag indicating application of new offset value Offset to the terminal.

In ST 202, since the application of new offset value Offset is indicated to the terminal in ST 201, the terminal adds previously held new offset value Offset to the reception-quality measurement-value in calculating the reception-quality measurement-result of an OFF-state cell.

As described above, according to Embodiment 2, terminal 300 previously holds a new offset value, and base station 100 indicates only a flag indicating the presence or absence of application of the new offset value. Accordingly, in Embodiment 2, the signaling amount required for indicating a new offset value can be reduced as compared with the case where the new offset value itself is indicated to terminal 300 from base station 100. Thus, according to Embodiment 2, switching between the ON and OFF states of cells can be controlled while the overhead for signaling to terminal 300 is further reduced.

Embodiment 3

In Embodiment 1 or 2, the case where a base station transmits configuration information on a new offset value to a terminal has been described. In contrast to this, in Embodiment 3, a description will be given of a case where the base station transmits no information on a new offset value to the terminal.

Note that, the base station according to Embodiment 3 has a basic configuration common to base station 100 and terminal 300 according to Embodiment 1, so that a description will be given with reference to FIGS. 2 and 5 also in Embodiment 3.

In base station 100 according to Embodiment 3, own-self traffic determining section 104 is unnecessary. Configuration-information generating section 105 generates configuration information including an existing offset value, but does not generate information on a new offset value unlike in Embodiment 1 or 2.

In terminal 300 according to Embodiment 3, when the transmission state of each base station (cell) to be received from base-station state determining section 206 is the OFF-state, measurement-result report determining section 302 acquires a new offset value from offset-value storing section 301. As in Embodiment 1, measurement-result report determining section 302 determines whether a reporting condition is satisfied by a reception-quality measurement-result acquirable by adding a previously held new offset value (and an existing offset value) to the reception-quality measurement-value of the OFF-state cell.

Stated differently, when detecting an OFF-state cell, terminal 300 always applies a new offset value to the reception-quality measurement-value of the OFF-state cell.

Figure 7:
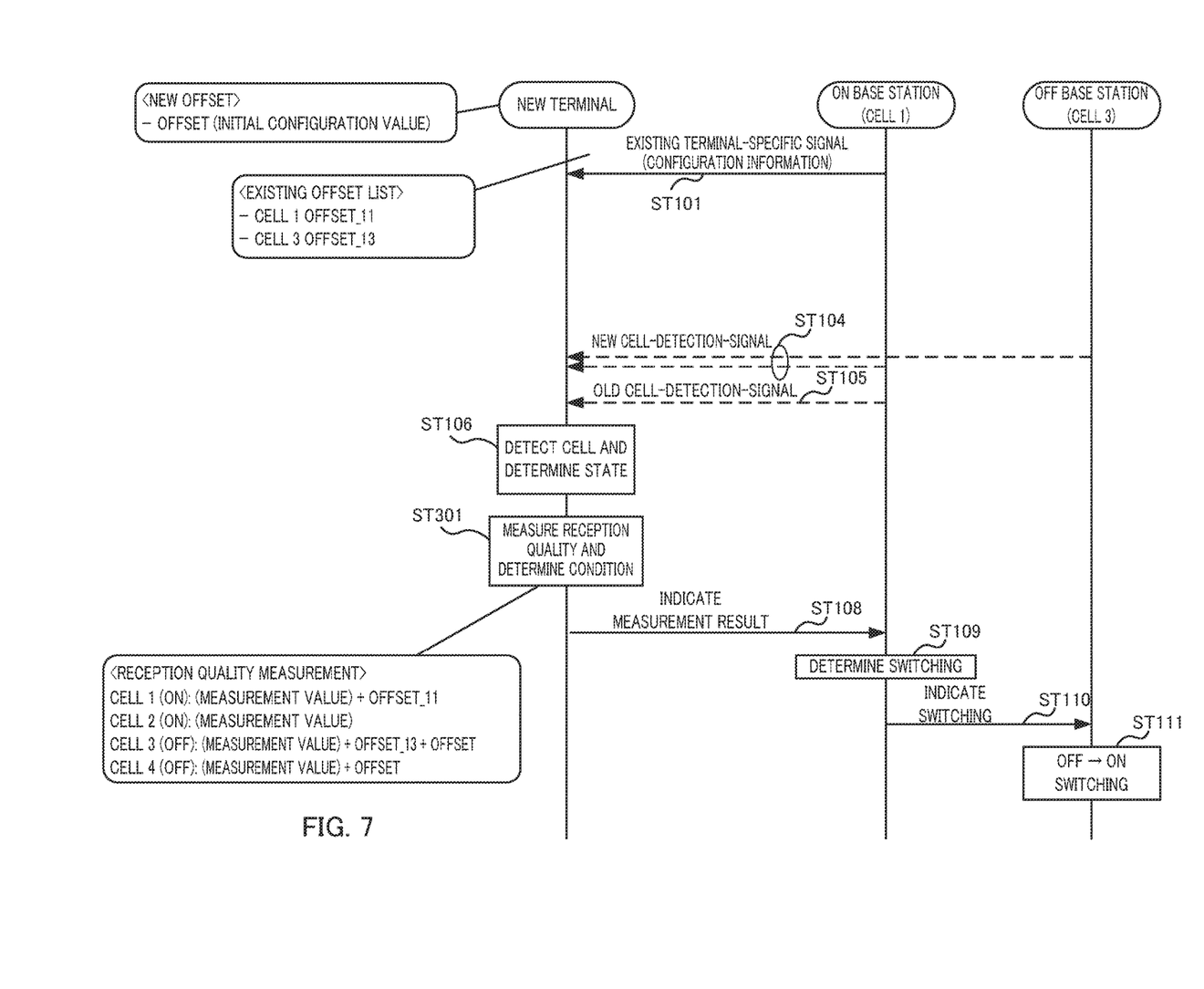
FIG. 7 is a sequence diagram illustrating operations of a base station and terminal according to Embodiment 3 of the present invention.

FIG. 7 is a sequence diagram illustrating an operation to determine which OFF-state base station is switched to the ON-state when high traffic is detected in an ON-state base station.

Note that, the steps for operations identical to the steps in Embodiment 2 (FIG. 6) are assigned the same reference numerals, and the descriptions for the identical steps will not be repeated in FIG. 7.

As illustrated in FIG. 7, there is no indication on new offset value Offset to a terminal (new terminal) from cell 1.

In ST 301, the terminal adds new offset value Offset previously held for the reception-quality measurement-value in calculating a reception-quality measurement-result of the cell determined to be an OFF-state cell in ST 106.

As described above, according to Embodiment 3, when determining that a certain cell is in the OFF-state, terminal 300 applies a previously held new offset value to a reception-quality measurement-value of the OFF-state cell. Accordingly, signaling for a new offset value is no longer required. Thus, in Embodiment 3, switching between the ON and OFF states of cells can be controlled while overhead for signaling is reduced by the amount corresponding to the signaling for a new offset value that has become unnecessary.

Each embodiment of the present invention has been described thus far.

The above embodiments have been described with an example in which an aspect of the present disclosure is implemented using a hardware configuration, but the present disclosure may also be implemented by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor. After fabrication of LSI, a field programmable gate array (FPGA), which is programmable, or a reconfigurable processor which allows reconfiguration of connections and configuration of circuit cells in LSI may be used.

Should a circuit integration technology replacing LSI appear as a result of advancements in semiconductor technology or other technologies derived from the technology, the functional blocks could be integrated using such a technology. The application of biotechnology and/or the like is also possible.

This disclosure of Japanese Patent Application No. 2014-056486, filed on Mar. 19, 2014, the contents of which including the specification and drawings are incorporated herein by reference in its entirety.

INDUSTRIAL APPLICABILITY

The present invention is useful in mobile communication systems.

REFERENCE SIGNS LIST

100 Base station
200, 300 Terminal
101, 201 Base-station communication IF
103, 202 Control section
104 Own-cell traffic determining section
105 Configuration-information generating section
106 Configuration-information transmitting section
107 Reception-quality measurement-result receiving section
108 Neighboring-traffic information transmitting section
109 ON/OFF switching determining section
110 ON/OFF switching-indication signal transmitting section
111 ON/OFF switching-indication signal receiving section
112 ON/OFF switching section
113 Cell-detection-signal transmitting section
203 Configuration-information receiving section
204 Cell-detection-signal receiving section
205 Reception-quality measurement section
206 Base-station state determining section
207, 302 Measurement-result report determining section
208 Measurement-result transmitting section
301 Offset-value storing section

The invention claimed is:

1. A terminal comprising:
a cell-detection-signal receiving section that receives a first cell-detection-signal transmitted from a first base station performing data transmission and a second cell-detection-signal transmitted from a second base station stopping data transmission;
a measurement section that measures, using the first or the second cell-detection-signal, reception quality of signals transmitted from a plurality of base stations including the first and the second base stations to acquire reception-quality measurement-values;
a configuration-information receiving section that receives first configuration information indicating a plurality of first offset values to be added respectively to the reception-quality measurement-values of the plurality of base stations and second configuration information on a second offset value to be added commonly to a reception-quality measurement-value of the second base station;
a base-station state determining section that determines, using the first and the second cell-detection-signals, whether a measurement-target base station for which reception quality is to be measured is the first base station or is the second base station; and
a measurement-result report determining section that calculates, when the measurement-target base station is the second base station, a reception-quality measurement-result by adding the first offset value corresponding to the measurement-target base station and the second offset value to a reception-quality measurement-value of the measurement-target base station and determines whether to report the reception-quality measurement-result.

2. The terminal according to claim 1, wherein the configuration-information receiving section receives the first configuration information included in a terminal-specific signal and receives the second configuration information included in a broadcast signal.

3. The terminal according to claim 1, wherein
the terminal previously holds the second offset value,
the configuration-information receiving section receives the second configuration information indicating a flag indicting the presence or absence of application of the second offset value, and
the measurement-result report determining section uses the previously held second offset value when the flag indicating application of the second offset value is received.

4. The terminal according to claim 1, wherein the base-station state determining section determines that a base station for which transmission of the first cell-detection-signal has been detected is the first base station and a base station for which no transmission of the first cell-detection-signal has been detected is the second base station from among the base stations for which transmission of the second cell-detection-signal has been detected.

5. The terminal according to claim 1, wherein, when a traffic amount of a base station to which the terminal is connected exceeds a threshold, the second configuration information is indicated to the terminal from the base station.

6. The terminal according to claim 5, wherein, in the base station to which the terminal is connected, it is determined that the traffic amount exceeds the threshold, when a number of terminals connected to the base station exceeds the threshold.

7. The terminal according to claim 5, wherein, in the base station to which the terminal is connected, it is determined that the traffic amount exceeds the threshold, when a number of resource blocks each having an interference level for the resource block indicated by information exchanged between the plurality of base stations exceeds the threshold.

8. The terminal according to claim 1, wherein the measurement-result report determining section determines to report the reception-quality measurement-result when the reception-quality measurement-result of the measurement-target base station is greater than a reception-quality measurement-result calculated by adding, to a reception-quality measurement-value of a serving cell, the first offset value corresponding to the serving cell, or when the reception-quality measurement-result of the measurement-target base station is greater than a predetermined threshold.

9. A terminal comprising:
a cell-detection-signal receiving section that receives a first cell-detection-signal transmitted from a first base station performing data transmission and a second cell-detection-signal transmitted from the first base station and a second base station stopping data transmission;
a measurement section that measures, using the first or the second cell-detection-signal, reception quality of signals transmitted from a plurality of base stations including the first and the second base stations to acquire reception-quality measurement-values;
a base-station state determining section that determines, using the first and the second cell-detection-signals, whether a measurement-target base station for which reception quality is to be measured is the first base station or is the second base station; and
a measurement-result report determining section that calculates, when the measurement-target base station is the second base station, a reception-quality measurement-result by adding, to a reception-quality measurement-value of the measurement-target base station, an offset value corresponding to the measurement-target base station among a plurality of first offset values to be added respectively to the reception-quality measurement-values of the plurality of base stations and a second offset value to be added commonly to the reception-quality measurement-value of the second base station, and determines whether to report the reception-quality measurement-result.

10. A base station comprising:
a configuration-information transmitting section that transmits first configuration information and second configuration information, the first configuration information indicating a plurality of first offset values to be added respectively to reception-quality measurement-values indicating reception quality of signals transmitted from a plurality of base stations including a first base station performing data transmission and a second base station stopping data transmission, the second configuration information being information on a second offset value to be added commonly to a reception-quality measurement-value of the second base station;
a cell-detection-signal transmitting section that transmits, when data transmission is performed, both a first cell-detection-signal and a second cell-detection-signal, and transmits, when data transmission is stopped, only the second cell-detection-signal;
a reception section that receives a reception-quality measurement-result for the second base station transmitted from a terminal, the reception-quality measurement-result being acquirable by adding the first offset value and the second offset value to the reception-quality measurement-value of the second base station; and
a switching determination section that determines whether to cause the second base station to start data transmission based on the reception-quality measurement-result.

11. A reception-quality reporting method comprising:
receiving a first cell-detection-signal transmitted from a first base station performing data transmission and a second cell-detection-signal transmitted from the first base station and a second base station stopping data transmission;
measuring, using the first or the second cell-detection-signal, reception quality of signals transmitted from a plurality of base stations including the first and the second base stations to acquire reception-quality measurement-values;
receiving first configuration information indicating a plurality of first offset values to be added respectively to the reception-quality measurement-values of the plurality of base stations and second configuration information on a second offset value to be added commonly to a reception-quality measurement-value of the second base station;
determining, using the first and the second cell-detection-signals, whether a measurement-target base station for which reception quality is to be measured is the first base station or is the second base station; and
calculating, when the measurement-target base station is the second base station, a reception-quality measurement-result by adding the first offset value corresponding to the measurement-target base station and the second offset value to a reception-quality measurement-value of the measurement-target base station, and determining whether to report the reception-quality measurement-result.

12. A reception-quality reporting method comprising:
receiving a first cell-detection-signal transmitted from a first base station performing data transmission and a second cell-detection-signal transmitted from the first base station, and a second base station stopping data transmission;
measuring, using the first or the second cell-detection-signal, reception quality of signals transmitted from a plurality of base stations including the first and the second base stations to acquire reception-quality measurement-values;
determining, using the first and the second cell-detection-signals, whether a measurement-target base station for which reception quality is to be measured is the first base station or is the second base station; and calculating, when the measurement-target base station is the second base station, a reception-quality measurement-result by adding, to a reception-quality measurement-value of the measurement-target base station, an offset value corresponding to the measurement-target base station among a plurality of first offset values to be added respectively to the reception-quality measurement-values of the plurality of base stations and a second offset value to be added commonly to the reception-quality measurement-value of the second base station, and determining whether to report the reception-quality measurement-result.

13. A data-transmission-state switching method comprising:

transmitting first configuration information and second configuration information, the first configuration information indicating a plurality of first offset values to be added respectively to reception-quality measurement-values indicating reception quality of signals transmitted from a plurality of base stations including a first base station performing data transmission and a second base station stopping data transmission, the second configuration information being information on a second offset value to be added commonly to a reception-quality measurement-value of the second base station;

transmitting, when data transmission is performed, both a first cell-detection-signal and a second cell-detection-signal, and transmitting, when data transmission is stopped, only the second cell-detection-signal;

receiving a reception-quality measurement-result for the second base station transmitted from a terminal, the reception-quality measurement-result being acquirable by adding the first offset value and the second offset value to the reception-quality measurement-value of the second base station; and determining whether to cause the second base station to start data transmission based on the reception-quality measurement-result.

* * * * *